(12) United States Patent
Chen et al.

(10) Patent No.: US 7,737,656 B2
(45) Date of Patent: Jun. 15, 2010

(54) AUTOMATIC RECHARGING MOUSE WITH SELF-MOVEMENT FEATURE

(75) Inventors: Yi-Guang Chen, Taipei (TW); Chin-Lung Lai, Taipei (TW)

(73) Assignee: Primax Electronics Ltd., Taipei (TW)

( * ) Notice: Subject to any disclaimer, the term of this patent is extended or adjusted under 35 U.S.C. 154(b) by 6 days.

(21) Appl. No.: 12/268,947

(22) Filed: Nov. 11, 2008

(65) Prior Publication Data

US 2010/0090661 A1    Apr. 15, 2010

(30) Foreign Application Priority Data

Oct. 15, 2008    (TW) ................. 97139467 A (51) Int. Cl.
*H02J 7/00*    (2006.01)
*G06F 3/033*    (2006.01)

(52) U.S. Cl. ................. 320/108; 320/DIG. 34; 345/163; 901/1

(58) Field of Classification Search .............. 320/108, 320/115, DIG. 34; 345/163; 901/1
See application file for complete search history.

(56) References Cited

U.S. PATENT DOCUMENTS

| | | | |
|---|---|---|---|
| 6,476,795 B1 * | 11/2002 | Derocher et al. ............ 345/163 |
| 7,180,503 B2 * | 2/2007 | Burr et al. ............ 345/163 |
| 7,501,780 B2 * | 3/2009 | Yamamoto ............ 318/587 |
| 7,581,282 B2 * | 9/2009 | Woo ............ 15/319 |
| 7,589,496 B2 * | 9/2009 | Chatterjee et al. ............ 320/114 |

\* cited by examiner

*Primary Examiner*—Patrick J Assouad
*Assistant Examiner*—Richard V Muralidar
(74) *Attorney, Agent, or Firm*—Kirton & McConkie; Evan R. Witt (57) ABSTRACT

An automatic mouse charging system includes a charger plate and an automatically chargeable mouse. The charger plate includes an audio signal emitter for emitting an audio signal and a charging module for providing electric energy. The automatically chargeable mouse includes a mouse case, an electric energy storage element, multiple audio signal receivers, a driving mechanism, and a control unit. The audio signal receivers are used for receiving the audio signal. The control unit is used for discriminating one of the audio signal receivers that receives the strongest audio signal, thereby outputting a corresponding movement signal to the driving mechanism. The automatically chargeable mouse is moved toward the audio signal receiver that receives the strongest audio signal according to the movement signal.

24 Claims, 6 Drawing Sheets

AUTOMATIC RECHARGING MOUSE WITH SELF-MOVEMENT FEATURE

FIELD OF THE INVENTION

The present invention relates to a charging system, and more particularly to a charging mouse system for charging a mouse.

BACKGROUND OF THE INVENTION

With rapid development of scientific and information industries, computers and the peripheral device thereof become essential in our daily lives. For example, mice are important peripheral devices of computers for establishing contact between the personal computers and the users. For helping the user well operate the computer, many novel mice (e.g. wireless mice) with expanded functions are developed in views of humanization and user-friendliness.

Conventionally, a mouse is communicated with a computer via wire linkage. The wire linkage is very troublesome and inconvenient. Instead of using the connecting wire, a corresponding wireless signal receiver is used for receiving wireless signals issued from the mouse body when the wireless mouse is operated. Since no additional connecting wire is required to connect the wireless mouse with the computer, the use of the wireless mouse is more convenient. In addition to the wireless mouse, other wireless peripheral devices such as wireless earphones, wireless keyboards and the like are communicated with the computer according to a wireless transmission technology. Among these wireless peripheral devices, the wireless mouse is very popular.

Although the wireless mouse has no spatial restriction because no signal wire is required, there are still some several drawbacks. For example, when the wireless mouse is operated, the electric energy supply system becomes more important because no power can be supplied to the wireless mouse through a connecting port of the computer. Therefore, the wireless mouse usually has a built-in electric energy storage element such as a battery or a rechargeable battery.

Since most users get used to operating the wired mouse without any built-in battery, the users of a wireless mouse usually ignore the available capacity of the built-in battery of the wireless mouse. Until the available capacity of the built-in battery is nearly exhausted, the users will just realize that the battery needs to be replaced with a new one or needs to be charged. In most situations, the users seldom carry the backup batteries. Even if a battery charger is acquired, the rechargeable battery needs to be removed from wireless mouse, then charged by the battery charger, and finally mounted in the wireless mouse. In other words, if the available capacity of the electric energy storage element is nearly exhausted, a troublesome process is required to charge the rechargeable battery.

Therefore, there is a need of providing an automatic mouse charging system so as to obviate the drawbacks encountered from the prior art.

SUMMARY OF THE INVENTION

It is an object of the present invention to provide an automatic mouse charging system for automatically charging a mouse.

In accordance with an aspect of the present invention, there is provided an automatic mouse charging system. The automatic mouse charging system includes a charger plate and an automatically chargeable mouse. The charger plate includes an audio signal emitter for emitting an audio signal and a charging module for providing electric energy. The automatically chargeable mouse includes a mouse case, an electric energy storage element, multiple audio signal receivers, a driving mechanism, and a control unit. The electric energy storage element is used for storing the electric energy that is transmitted from the charging module and providing electric power required for operations of the automatically chargeable mouse. The audio signal receivers are disposed on the mouse case for receiving the audio signal. The driving mechanism is used for providing motive power required to move the automatically chargeable mouse. The control unit is connected to the audio signal receivers and the driving mechanism for discriminating one of the audio signal receivers that receives the strongest audio signal, thereby outputting a corresponding movement signal to the driving mechanism. The automatically chargeable mouse is moved toward the audio signal receiver that receives the strongest audio signal according to the movement signal.

In an embodiment, the automatically chargeable mouse and the charger plate are placed on a working plane.

In an embodiment, the driving mechanism includes a roller, a motor and a direction-changing module. The roller is partially protruded outside the mouse case such that the roller is contacted with the working plane. The motor is connected to the roller for driving rotation of the roller. The direction-changing module is connected to the control unit and the roller for controlling a moving direction of the roller according to the movement signal outputted from the control unit.

In an embodiment, the charger plate is an induction charger plate for charging the electric energy storage element when the automatically chargeable mouse is placed on the charger plate.

In an embodiment, the audio signal receivers include a first audio signal receiver arranged at a front end of the mouse case, a second audio signal receiver arranged at a right side of the mouse case, and a third audio signal receiver arranged at a left side of the mouse case.

In an embodiment, the control unit issues a forward movement signal to the driving mechanism if the audio signal received by the first audio signal receiver has the strongest intensity, so that the automatically chargeable mouse is moved forwardly toward the first audio signal receiver according to the forward movement signal.

In an embodiment, the control unit issues a right-side movement signal to the driving mechanism if the audio signal received by the second audio signal receiver has the strongest intensity, so that the automatically chargeable mouse is moved rightwards toward the second audio signal receiver according to the right-side movement signal.

In an embodiment, the control unit issues a left-side movement signal to the driving mechanism if the audio signal received by the third audio signal receiver has the strongest intensity, so that the automatically chargeable mouse is moved leftwards toward the third audio signal receiver according to the left-side movement signal.

Preferably, the audio signal receivers are microphones or microphone arrays.

Preferably, the electric energy storage element is a rechargeable battery.

In an embodiment, the automatically chargeable mouse further comprises an electric power detection unit for detecting an available capacity of the electric energy storage element.

In an embodiment, the automatically chargeable mouse further includes a charging signal generator. The charger plate further includes a charging signal receiver. If the available capacity of the electric energy storage element is lower than a threshold value, the control unit controls the charging signal generator to issue a charging signal to the charging signal receiver of the charger plate such that the charger plate generates the audio signal.

In an embodiment, the charger plate further includes a charging button. When the charging button is pressed down, the automatic mouse charging system enters an automatic charging mode such that the charger plate generates the audio signal.

In an embodiment, the automatically chargeable mouse further includes a charging button and a charging signal generator. The charger plate further includes a charging signal receiver. When the charging button is pressed down, the automatic mouse charging system enters an automatic charging mode such that the charging signal generator issues a charging signal to the charging signal receiver of the charger plate. The charger plate generates the audio signal in response to the charging signal.

In an embodiment, the automatically chargeable mouse further includes a time counter for calculating a suspension time of the automatically chargeable mouse and a charging signal generator. The charger plate further includes a charging signal receiver. If the automatically chargeable mouse has been suspended for a certain time period, the control unit controls the charging signal generator to generate and issue a charging signal to the charging signal receiver of the charger plate such that the charger plate generates the audio signal.

In an embodiment, the charger plate is electrically connected to a power source such that electric energy is transmitted from the power source to the charger plate.

In an embodiment, the power source is a utility power source.

In an embodiment, the automatic mouse charging system further includes a computer, which is connected to the charger plate.

In an embodiment, the automatically chargeable mouse further includes an electric power detection unit for detecting an available capacity of the electric energy storage element.

In an embodiment, the automatically chargeable mouse further includes a charging signal generator. The computer further includes a charging signal receiver. If the available capacity of the electric energy storage element is lower than a threshold value, the control unit controls the charging signal generator to issue a charging signal to the charging signal receiver of the computer such that the computer issues a command to allow the charger plate to generate the audio signal.

In an embodiment, the computer further includes a charging button. When the charging button is pressed down, the automatic mouse charging system enters an automatic charging mode such that the computer issues a command to allow the charger plate to generate the audio signal.

In an embodiment, the automatically chargeable mouse further includes a charging button and a charging signal generator. The computer further includes a charging signal receiver. When the charging button is pressed down, the automatic mouse charging system enters an automatic charging mode such that the charging signal generator issues a charging signal to the charging signal receiver of the computer and the computer issues a command to allow the charger plate to generate the audio signal.

In an embodiment, the automatically chargeable mouse further includes a time counter for calculating a suspension time of the automatically chargeable mouse and a charging signal generator. The computer further includes a charging signal receiver. If the automatically chargeable mouse has been suspended for a certain time period, the control unit controls the charging signal generator to generate and issue a charging signal to the charging signal receiver of the computer such that the computer issues a command to allow the charger plate to generate the audio signal.

Preferably, the computer is a notebook computer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
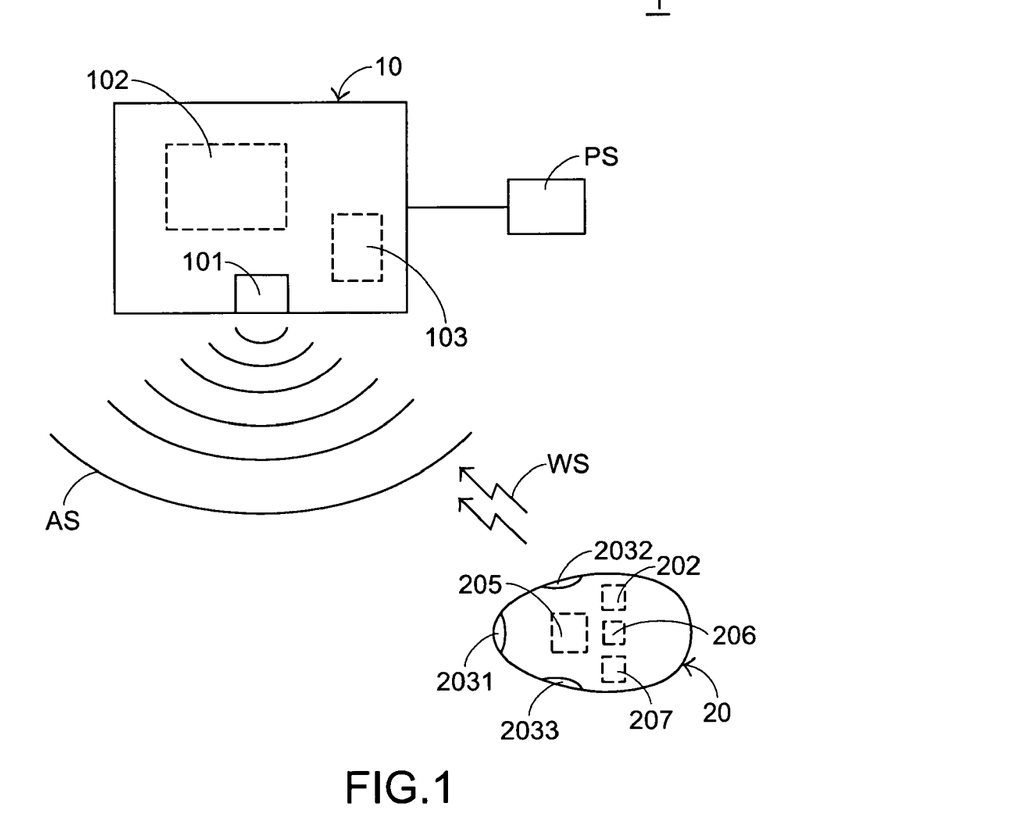
FIG. 1 is a schematic view illustrating an automatic mouse charging system according to a first preferred embodiment of the present invention.

FIG. 1 is a schematic view illustrating an automatic mouse charging system according to a first preferred embodiment of the present invention. As shown in FIG. 1, the automatic mouse charging system 1 principally comprises a charger plate 10 and an automatically chargeable mouse 20. The charger plate 10 is electrically connected to a power source PS. An example of the power source PS is a utility power source. The charger plate 10 comprises an audio signal emitter 101, a charging module 102 and a charging signal receiver 103. The audio signal emitter 101 is used for emitting an audio signal AS. The charging module 102 is used for providing electric power to the automatically chargeable mouse 20 during the charging process. The charging signal receiver 103 is used for receiving a charging signal WS.

Figure 2:
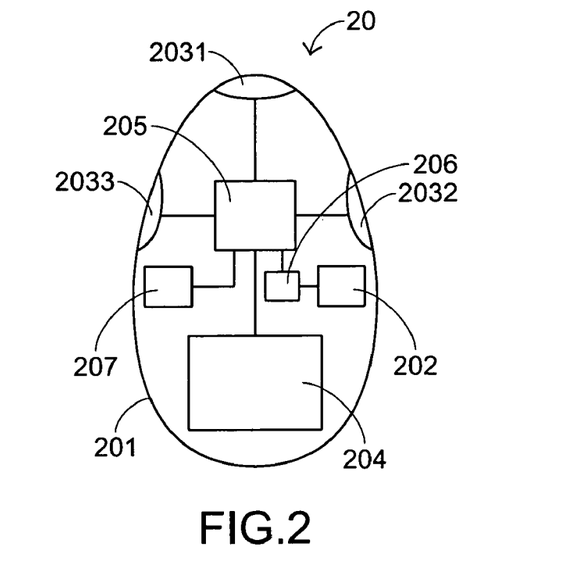
FIG. 2 is a schematic view illustrating the internal components of the automatically chargeable mouse of the automatic mouse charging system shown in FIG. 1.

FIG. 2 is a schematic view illustrating the internal components of the automatically chargeable mouse of the automatic mouse charging system shown in FIG. 1. The automatically chargeable mouse 20 principally comprises a mouse case 201, an electric energy storage element 202, multiple audio signal receivers 2031, 2032 and 2033, a driving mechanism 204, a control unit 205, an electric power detection unit 206 and a charging signal generator 207. The electric energy storage element 202 can provide electric power required for operation of the automatically chargeable mouse 20 and can store electric power therein. An example of the electric energy storage element 202 is a rechargeable battery. The audio signal receivers 2031, 2032 and 2033 are arranged on the mouse case 201 for receiving the audio signal AS that is emitted by the charger plate 10. The first audio signal receiver 2031 is arranged at the front end of the mouse case 201. The second audio signal receiver 2032 is arranged at the right side of the mouse case 201. The third audio signal receiver 2033 is arranged at the left side of the mouse case 201. The audio signal receivers 2031, 2032 and 2033 are for example microphones or microphone arrays. The driving mechanism 204 is used for providing motive power for moving the automatically chargeable mouse 20. The electric power detection unit 206 is electrically connected to the electric energy storage element 202 and the control unit 205 for detecting the available capacity of the electric energy storage element 202. The charging signal generator 207 is electrically connected to the control unit 205. In a case that the available capacity of the electric energy storage element 202 is lower than a threshold value, the control unit 205 will control the charging signal generator 207 to generate and issue a charging signal WS to the charger plate 10. When the charging signal WS is received by the charger plate 10, the charger plate 10 emits an audio signal AS. The control unit 205 is electrically connected to the audio signal receivers 2031, 2032 and 2033, the control unit 205, the electric power detection unit 206 and the charging signal generator 207 for controlling operations of the components that are connected thereto. In this embodiment, the control unit 205 can analyze which audio signal AS received by the audio signal receiver 2031, 2032 or 2033 has the strongest intensity. After the audio signal AS having the strongest intensity is discriminated, the control unit 205 will output a corresponding movement signal to the driving mechanism 204. According to the movement signal, the automatically chargeable mouse 20 is moved along the direction toward the audio signal receiver that receives the strongest audio signal AS.

Figure 3:
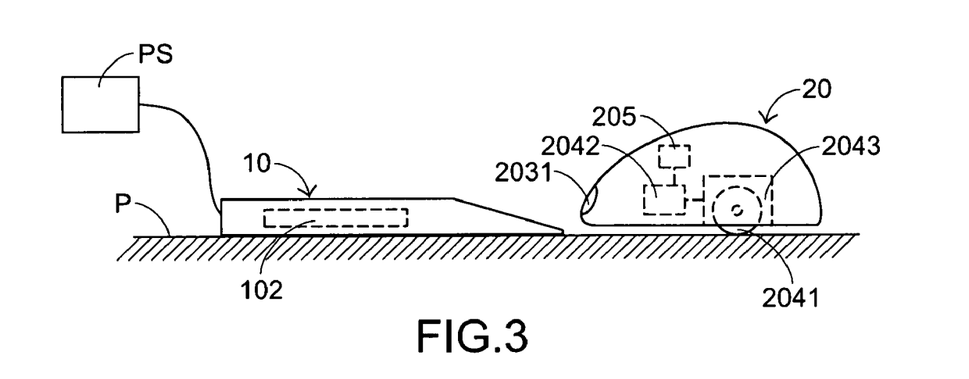
FIG. 3 is a schematic view illustrating the automatic mouse charging system of FIG. 1, in which the charger plate and the automatically chargeable mouse are both placed on a working plate.

FIG. 3 is a schematic view illustrating the automatic mouse charging system of FIG. 1. As shown in FIG. 3, the charger plate 10 and the automatically chargeable mouse 20 are both placed on the working plane P. Since the charger plate 10 and the automatically chargeable mouse 20 are coplanar, the automatically chargeable mouse 20 can be moved to the charger plate 10 to acquire the electric energy that is supplied by the charger plate 10. Moreover, the edges of the charger plate 10 have slant surfaces. Due to the slant surfaces, the automatically chargeable mouse 20 can be moved to the top surface of the charger plate 10 without difficulty. Since the majority of the charger plate 10 is a flat plate, the automatically chargeable mouse 20 can be moved to the top surface of the charger plate 10 from any direction.

The driving mechanism 204 of the automatically chargeable mouse 20 may provide motive power for moving the automatically chargeable mouse 20. As shown in FIG. 3, the driving mechanism 204 comprises a roller 2041, a motor 2042 and a direction-changing module 2043. The roller 2041 is partially protruded outside the mouse case 201 such that the roller 2041 is contacted with the working plane P. The motor 2042 is connected to the roller 2041 for driving rotation of the roller 2041. The direction-changing module 2043 is connected to the control unit 205 and the roller 2041. According to the movement signal outputted from the control unit 205, the direction-changing module 2043 will control the moving direction of the roller 2041. An example of the charger plate 10 is an induction charger plate. When the automatically chargeable mouse 20 is placed on the charger plate 10, the charger plate 10 can induce the automatically chargeable mouse 20 and provide electric energy to the electric energy storage element 202.

In addition to the moving capability, the automatically chargeable mouse 20 can detect the position of the charger plate 10 and be moved to charger plate 10 so as to be charged by the charger plate 10. In accordance with a key feature of the present invention, the automatic mouse charging system enters an automatic charging mode if the available capacity of the electric energy storage element 202 is insufficient. In the automatic charging mode, the audio signal emitter 101 of the charger plate 10 emits an audio signal AS and the automatically chargeable mouse 20 is moved to the charger plate 10.

Hereinafter, the operations of the automatic mouse charging system of the present invention will be illustrated with reference to FIG. 3 and FIGS. 4A~4C.

In a case that the available capacity of the electric energy storage element 202 detected by the electric power detection unit 206 is lower than the predetermined threshold value, the control unit 205 will control the charging signal generator 207 to generate and issue a charging signal WS to the charger plate 10. When the charging signal WS is received by the charger plate 10, the charger plate 10 emits an audio signal AS (as shown in FIG. 1).

Figure 4A:
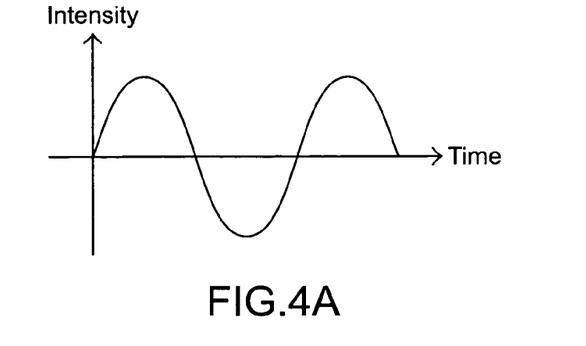
FIGS. 4A, 4B and 4C are schematic timing waveform diagrams illustrating the intensities of the audio signals received by the first, second and third audio signal receivers, respectively.
Figure 4B:
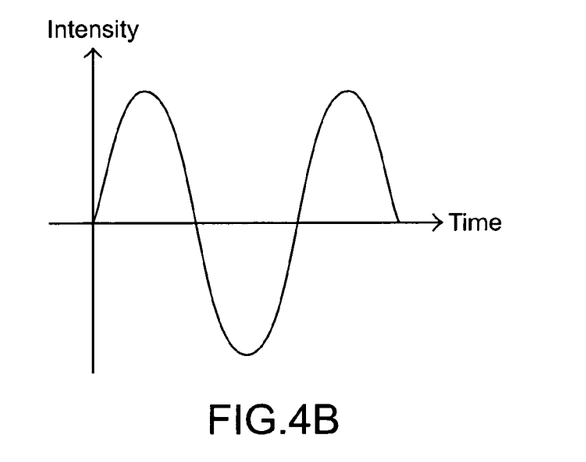
Figure 4C:
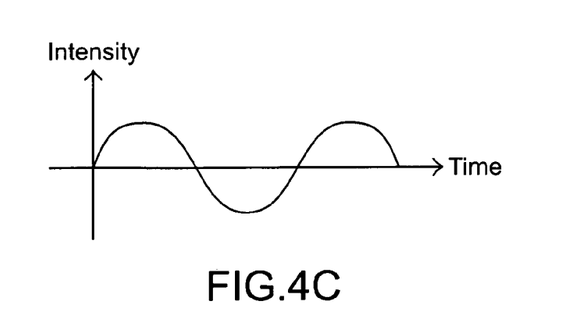

FIGS. 4A, 4B and 4C are schematic timing waveform diagrams illustrating the intensities of the audio signals received by the first, second and third audio signal receivers, respectively. Since the audio signal AS is emitted by the charger plate 10 and the charger plate 10 is disposed at the right side of the automatically chargeable mouse 20 (as shown in FIG. 1), the second audio signal receiver 2032 that is arranged at the right side of the mouse case 201 is relatively closer to the charger plate 10. Under this circumstance, the audio signal AS that is received by the second audio signal receiver 2032 has the strongest intensity, as can be seen in FIG. 4B. As shown in FIG. 4A, since the first audio signal receiver 2031 is arranged at the front end of the mouse case 201, the audio signal AS that is received by the first audio signal receiver 2031 has the medium intensity. As shown in FIG. 4C, since the third audio signal receiver 2033 is arranged at the left side of the mouse case 201, the third audio signal receiver 2033 is relatively far from the charger plate 10 and the audio signal AS that is received by the third audio signal receiver 2033 has the weakest intensity. After analyzing the intensities of the audio signals AS received by the audio signal receiver 2031, 2032 and 2032, the control unit 205 will discriminate that the audio signal AS received by the second audio signal receiver 2032 has the strongest intensity so as to realize the orientation of the charger plate 10. In other words, the control unit 205 will realize that the charger plate 10 is arranged at the right side of the automatically chargeable mouse 20, thereby issuing a right-side movement signal to the direction-changing module 2043 of the driving mechanism 204 (as shown in FIG. 3). According to the right-side movement signal, the automatically chargeable mouse 20 is moved toward the right side. Similarly, if the audio signal AS received by the first audio signal receiver 2031 has the strongest intensity, the control unit 205 generates a forward movement signal to the direction-changing module 2043 of the driving mechanism 204. According to the forward movement signal, the automatically chargeable mouse 20 is moved forwardly. Similarly, if the audio signal AS received by the third audio signal receiver 2033 has the strongest intensity, the control unit 205 generates a left-side movement signal to the direction-changing module 2043 of the driving mechanism 204. According to the left-side movement signal, the automatically chargeable mouse 20 is moved toward the left side. By continuously detecting the position of the charger plate 10 and adaptively changing the moving directions of the automatically chargeable mouse 20, the automatically chargeable mouse 20 is finally moved to the top surface of the charger plate 10. At this moment, the charger plate 10 may induce the automatically chargeable mouse 20, so that the charging module 102 of the charger plate 10 provides electric energy to the electric energy storage element 202. The detailed configurations of the driving mechanism 204 and the induction charger plate are known in the art, and are not redundantly described herein.

Figure 5:
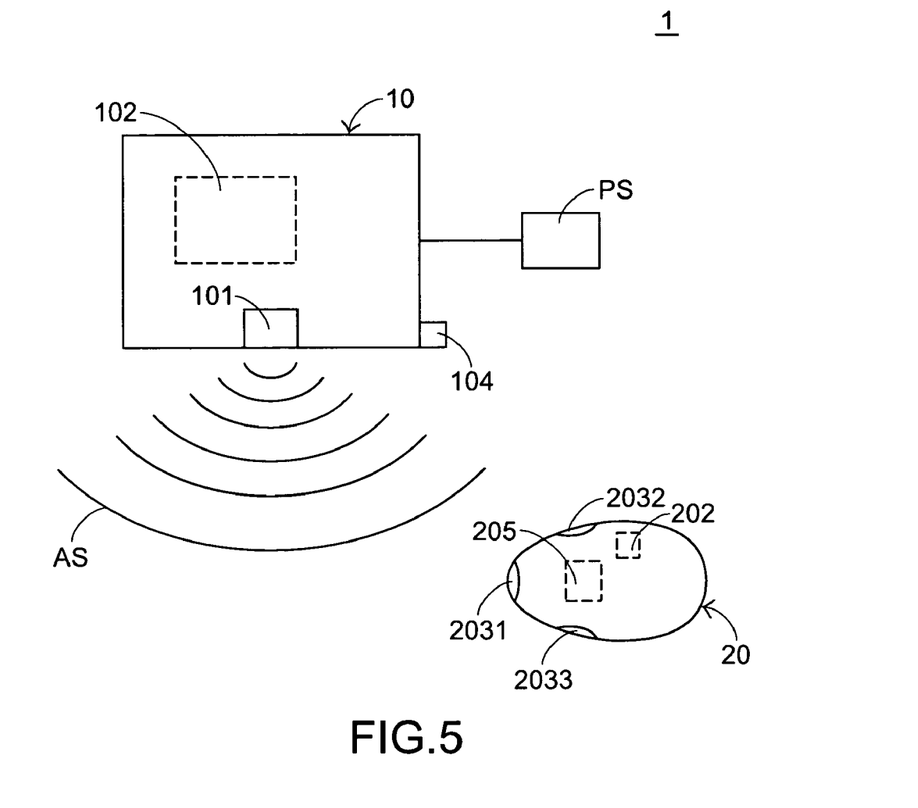
FIG. 5 is a schematic view illustrating an automatic mouse charging system according to a second preferred embodiment of the present invention.

FIG. 5 is a schematic view illustrating an automatic mouse charging system according to a second preferred embodiment of the present invention. In comparison with the first preferred embodiment, the charger plate 10 of the automatic mouse charging system of FIG. 5 has a charging button 104 but the charging signal receiver 103 is dispensed with. In addition, the electric power detection unit 206 and the charging signal generator 207 of the automatically chargeable mouse 20 are dispensed with. In a case that the charging button 104 of the charger plate 10 as shown in FIG. 5 is pressed down by the user, the audio signal emitter 101 of the charger plate 10 emits an audio signal AS. The audio signal AS will be received by the audio signal receiver 2031, 2032 or 2033. According to the process as described in the first preferred embodiment, the automatically chargeable mouse 20 is finally moved to the top surface of the charger plate 10 by continuously detecting the position of the charger plate 10 and adaptively changing the moving directions of the automatically chargeable mouse 20. At this moment, the charger plate 10 may induce the automatically chargeable mouse 20, so that the charging module 102 of the charger plate 10 provides electric energy to the electric energy storage element 202.

Figure 6:
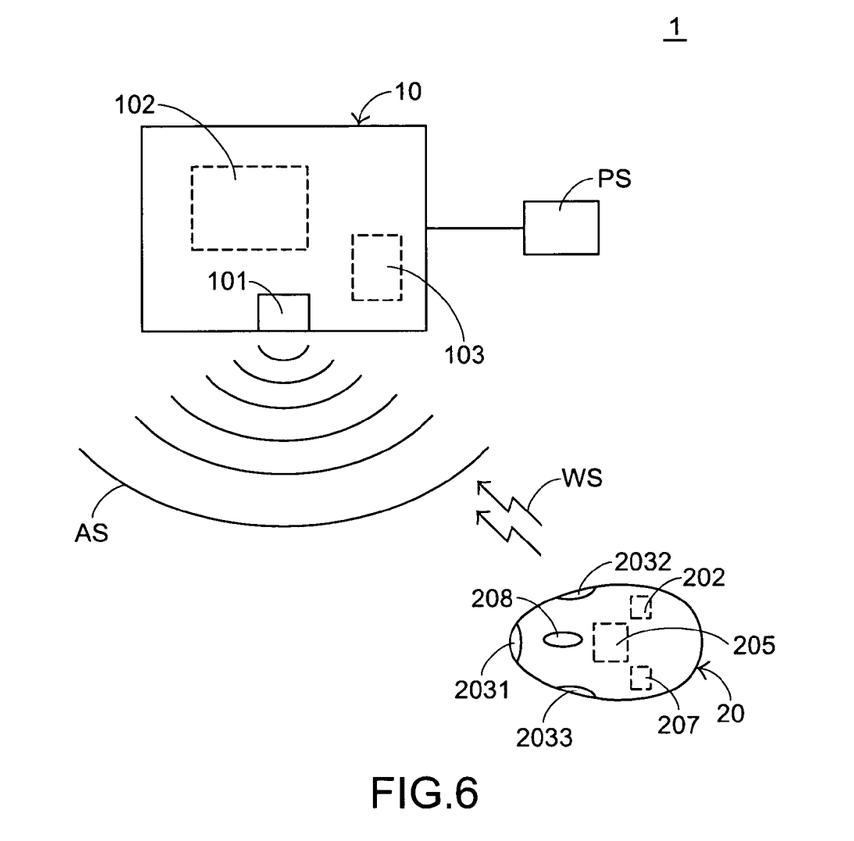
FIG. 6 is a schematic view illustrating an automatic mouse charging system according to a third preferred embodiment of the present invention.

FIG. 6 is a schematic view illustrating an automatic mouse charging system according to a third preferred embodiment of the present invention. In comparison with the first preferred embodiment, the mouse case 201 of the automatically chargeable mouse 20 of the automatic mouse charging system shown in FIG. 6 has a charging button 208 but the electric power detection unit 206 is dispensed with. In a case that the charging button 208 on the mouse case 201 is pressed down, the charging signal generator 207 will generate and issue a charging signal WS to the charger plate 10. When the charging signal WS is received by the charger plate 10, the charger plate 10 emits an audio signal AS. According to the process as described in the first preferred embodiment, the automatically chargeable mouse 20 is finally moved to the top surface of the charger plate 10 by continuously detecting the position of the charger plate 10 and adaptively changing the moving directions of the automatically chargeable mouse 20. At this moment, the charger plate 10 may induce the automatically chargeable mouse 20, so that the charging module 102 of the charger plate 10 provides electric energy to the electric energy storage element 202.

Figure 7:
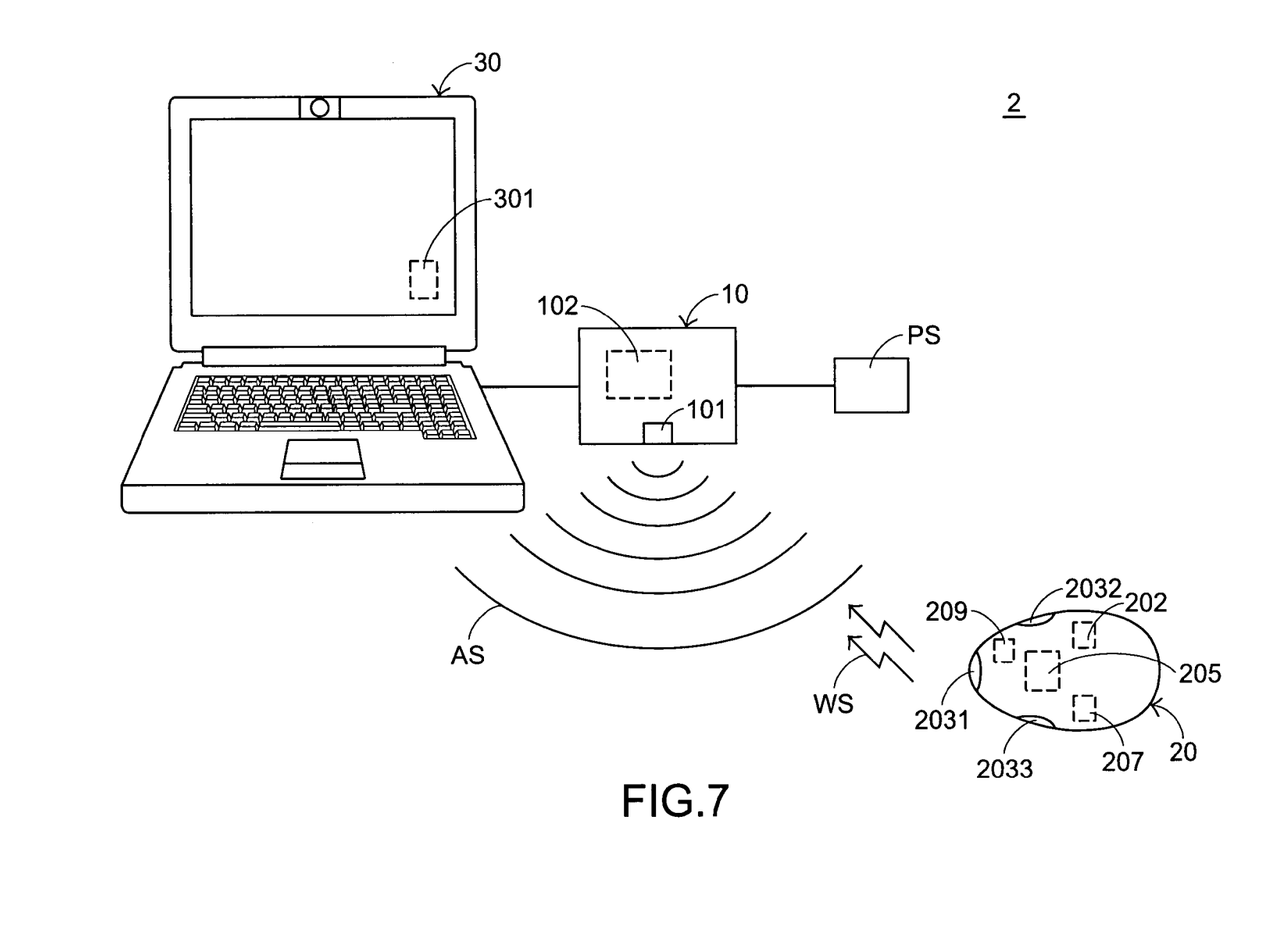
FIG. 7 is a schematic view illustrating an automatic mouse charging system according to a fourth preferred embodiment of the present invention.

FIG. 7 is a schematic view illustrating an automatic mouse charging system according to a fourth preferred embodiment of the present invention. s shown in FIG. 1, the automatic mouse charging system 2 principally comprises a charger plate 10, an automatically chargeable mouse 20 and a computer 30. An example of the computer 30 is a notebook computer, which is electrically connected to the charger plate 10. In this embodiment, the automatically chargeable mouse 20 further comprises a time counter 209. The time counter 209 is also electrically connected to the control unit 205 for calculating the suspension time of the automatically chargeable mouse 20. In addition, the computer 30 has a charging signal receiver 301 for receiving the charging signal WS. If the computer 30 has not been used for a certain time period or if the computer 30 has been powered off for the certain time period, the control unit 205 will control the charging signal generator 207 to generate and issue a charging signal WS to the charging signal receiver 301 of the computer 30. When the charging signal WS is received, the computer 30 issues a command. According to the command, the charger plate 10 emits an audio signal AS to start the automatic charging process.

In the above embodiments, the automatic mouse charging system of the present invention can discriminate the position of the charger plate 10 by detecting the audio signal AS that is emitted by the charger plate 10. The use of the audio signal AS is very advantageous because the audio signal AS is not hindered by an obstacle or other object on the working plane P. Please refer to FIG. 1 again. In a case that there is an obstacle (not shown) between the first audio signal receiver 2031 and the charger plate 10, the audio signal AS is partially hindered by the obstacle. At this moment, the audio signal AS received by the first audio signal receiver 2031 has a weak intensity but the audio signal AS having the strongest intensity is still received by the second audio signal receiver 2032. Consequently, the automatically chargeable mouse 20 is moved toward the right side to be departed from the obstacle. Until the audio signal receiver 2031 is no longer hindered by the obstacle and the audio signal AS received by the first audio signal receiver 2031 has the strongest intensity, the automatically chargeable mouse 20 is moved forwardly toward the charger plate 10.

From the above description, the automatic mouse charging system of the present invention can realize the orientation of the charger plate by detecting the audio signal. Moreover, the automatic charging function can be triggered in diverse manners. For example, by detecting the available capacity of the electric energy storage element, pressing down the charging button of the computer or the automatically chargeable mouse or using the time counter to detect whether the automatically chargeable mouse has been suspended for a certain time period, the automatic charging function is triggered to automatically charge the automatically chargeable mouse. In other words, different fashions of automatic mouse charging systems may be adapted according to the usual practices and requirements of the users. In addition, since the automatically chargeable mouse can be automatically charged, the users need not notice whether the available capacity of the electric energy storage element is nearly exhausted.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic mouse charging system comprising:
  a charger plate comprising an audio signal emitter for emitting an audio signal and a charging module for providing electric energy; and
  an automatically chargeable mouse comprising:
    a mouse case;
    an electric energy storage element for storing the electric energy that is transmitted from said charging module and providing electric power required for operations of said automatically chargeable mouse;
    multiple audio signal receivers disposed on said mouse case for receiving said audio signal;
    a driving mechanism for providing motive power required to move said automatically chargeable mouse; and a control unit connected to said audio signal receivers and said driving mechanism for discriminating one of said audio signal receivers that receives the strongest audio signal, thereby outputting a corresponding movement signal to said driving mechanism, wherein said automatically chargeable mouse is moved toward said audio signal receiver that receives the strongest audio signal according to said movement signal.

2. The automatic mouse charging system according to claim 1 wherein said automatically chargeable mouse and said charger plate are placed on a working plane.

3. The automatic mouse charging system according to claim 2 wherein said driving mechanism comprises:
   a roller partially protruded outside said mouse case such that said roller is contacted with said working plane;
   a motor connected to said roller for driving rotation of said roller; and
   a direction-changing module connected to said control unit and said roller for controlling a moving direction of said roller according to said movement signal outputted from said control unit.

4. The automatic mouse charging system according to claim 1 wherein said charger plate is an induction charger plate for charging said electric energy storage element when said automatically chargeable mouse is placed on said charger plate.

5. The automatic mouse charging system according to claim 1 wherein said audio signal receivers include a first audio signal receiver arranged at a front end of said mouse case, a second audio signal receiver arranged at a right side of the mouse case, and a third audio signal receiver arranged at a left side of the mouse case.

6. The automatic mouse charging system according to claim 5 wherein said control unit issues a forward movement signal to said driving mechanism if said audio signal received by said first audio signal receiver has the strongest intensity, so that said automatically chargeable mouse is moved forwardly toward said first audio signal receiver according to said forward movement signal.

7. The automatic mouse charging system according to claim 5 wherein said control unit issues a right-side movement signal to said driving mechanism if said audio signal received by said second audio signal receiver has the strongest intensity, so that said automatically chargeable mouse is moved rightwards toward said second audio signal receiver according to said right-side movement signal.

8. The automatic mouse charging system according to claim 5 wherein said control unit issues a left-side movement signal to said driving mechanism if said audio signal received by said third audio signal receiver has the strongest intensity, so that said automatically chargeable mouse is moved leftwards toward said third audio signal receiver according to said left-side movement signal.

9. The automatic mouse charging system according to claim 1 wherein said audio signal receivers are microphones or microphone arrays.

10. The automatic mouse charging system according to claim 1 wherein said electric energy storage element is a rechargeable battery.

11. The automatic mouse charging system according to claim 1 wherein said automatically chargeable mouse further comprises an electric power detection unit for detecting an available capacity of said electric energy storage element.

12. The automatic mouse charging system according to claim 11 wherein said automatically chargeable mouse further comprises a charging signal generator, said charger plate further comprises a charging signal receiver, and if said available capacity of said electric energy storage element is lower than a threshold value, said control unit controls said charging signal generator to issue a charging signal to said charging signal receiver of said charger plate such that said charger plate generates said audio signal.

13. The automatic mouse charging system according to claim 1 wherein said charger plate further comprises a charging button, and when said charging button is pressed down, said automatic mouse charging system enters an automatic charging mode such that said charger plate generates said audio signal.

14. The automatic mouse charging system according to claim 1 wherein said automatically chargeable mouse further comprises a charging button and a charging signal generator, and said charger plate further comprises a charging signal receiver, wherein when said charging button is pressed down, said automatic mouse charging system enters an automatic charging mode such that said charging signal generator issues a charging signal to said charging signal receiver of said charger plate and said charger plate generates said audio signal in response to said charging signal.

15. The automatic mouse charging system according to claim 1 wherein said automatically chargeable mouse further comprises a time counter for calculating a suspension time of said automatically chargeable mouse and a charging signal generator, and said charger plate further comprises a charging signal receiver, wherein if said automatically chargeable mouse has been suspended for a certain time period, said control unit controls said charging signal generator to generate and issue a charging signal to said charging signal receiver of said charger plate such that said charger plate generates said audio signal.

16. The automatic mouse charging system according to claim 1 wherein said charger plate is electrically connected to a power source such that electric energy is transmitted from said power source to said charger plate.

17. The automatic mouse charging system according to claim 16 wherein said power source is a utility power source.

18. The automatic mouse charging system according to claim 1 further comprising a computer, which is connected to said charger plate.

19. The automatic mouse charging system according to claim 18 wherein said automatically chargeable mouse further comprises an electric power detection unit for detecting an available capacity of said electric energy storage element.

20. The automatic mouse charging system according to claim 19 wherein said automatically chargeable mouse further comprises a charging signal generator, said computer further comprises a charging signal receiver, and if said available capacity of said electric energy storage element is lower than a threshold value, said control unit controls said charging signal generator to issue a charging signal to said charging signal receiver of said computer such that said computer issues a command to allow said charger plate to generate said audio signal.

21. The automatic mouse charging system according to claim 18 wherein said computer further comprises a charging button, and when said charging button is pressed down, said automatic mouse charging system enters an automatic charging mode such that said computer issues a command to allow said charger plate to generate said audio signal.

22. The automatic mouse charging system according to claim 18 wherein said automatically chargeable mouse further comprises a charging button and a charging signal generator, and said computer further comprises a charging signal receiver, wherein when said charging button is pressed down, said automatic mouse charging system enters an automatic charging mode such that said charging signal generator issues a charging signal to said charging signal receiver of said computer and said computer issues a command to allow said charger plate to generate said audio signal.

23. The automatic mouse charging system according to claim 18 wherein said automatically chargeable mouse further comprises a time counter for calculating a suspension time of said automatically chargeable mouse and a charging signal generator, and said computer further comprises a charging signal receiver, wherein if said automatically chargeable mouse has been suspended for a certain time period, said control unit controls said charging signal generator to generate and issue a charging signal to said charging signal receiver of said computer such that said computer issues a command to allow said charger plate to generate said audio signal.

24. The automatic mouse charging system according to claim 18 wherein said computer is a notebook computer.

* * * * *